United States Patent
Moore et al.

(10) Patent No.: US 8,149,841 B2
(45) Date of Patent: Apr. 3, 2012

(54) SYSTEM AND METHOD FOR END-USER CUSTOM PARSING DEFINITIONS

(75) Inventors: Todd A. Moore, Sterling, VA (US); Timothy J. Menninger, Midlothian, VA (US); Edward G. Quackenbush, Oakton, VA (US)

(73) Assignee: EMC Corporation, Hopkinton, MA (US)

( * ) Notice: Subject to any disclaimer, the term of this patent is extended or adjusted under 35 U.S.C. 154(b) by 219 days.

(21) Appl. No.: 12/494,407

(22) Filed: Jun. 30, 2009

(65) Prior Publication Data

US 2010/0002704 A1  Jan. 7, 2010

Related U.S. Application Data

(60) Provisional application No. 61/078,125, filed on Jul. 3, 2008.

(51) Int. Cl.
*H04L 12/28* (2006.01)
*H04L 12/56* (2006.01)
*G06F 15/16* (2006.01)

(52) U.S. Cl. .................... 370/394; 709/231; 709/246

(58) Field of Classification Search .................. 370/394; 709/230, 231, 246

See application file for complete search history.

(56) References Cited

U.S. PATENT DOCUMENTS

| | | | |
|---|---|---|---|
| 2004/0088425 A1* | 5/2004 | Rubinstein et al. | 709/230 |
| 2007/0192085 A1* | 8/2007 | Roulland et al. | 704/9 |

\* cited by examiner

*Primary Examiner* — Ronald Abelson

(74) *Attorney, Agent, or Firm* — Edell, Shapiro & Finnan, LLC

(57) ABSTRACT

Systems and methods for performing customizable analysis of a communication session between two entities includes loading predetermined first parser definitions, stored as at least one binary file, receiving second parser definitions in a form other than a binary file form, after the first parser definitions are already operating, loading and compiling the second parser definitions, and applying the first and second parser definitions to a communication session, wherein the first parser definitions identify standard components of the communication session and the second parser definitions are customizable and identify non-standard components of the communication session.

19 Claims, 4 Drawing Sheets

SYSTEM AND METHOD FOR END-USER CUSTOM PARSING DEFINITIONS

This application claims the benefit of U.S. provisional Application No. 61/078,125, filed Jul. 3, 2008, the entirety of which is incorporated herein by reference.

FIELD OF THE INVENTION

Embodiments of the present invention are directed to data analysis and more particularly to systems and methods that enable customizable parsing definitions for session analysis.

BACKGROUND

The consistent demand for computer and other network services has increased the need for better network security tools. A variety of techniques have been deployed to shield networks from hacking and other intrusions. Those protective techniques may be categorized as either risk avoidance systems or risk management systems.

Risk avoidance techniques involve introducing a barrier to prevent inappropriate entry into a network. Such systems place reliance on keeping intruders out of the network entirely, rather than monitoring inappropriate network traffic after logging in. Risk avoidance systems include dedicated network firewalls and mandatory encryption over the network.

Risk management approaches, in contrast, adopt the philosophy that a network can not keep everyone out, and so rely upon detection of intrusive activity after logging in. Unfortunately, intrusion detection systems often lend a false sense of security to systems administrators, while not really solving the underlying security problem. Intrusion detection systems produce a high rate of false positive identification, by inaccurately reporting legitimate network activity as suspicious. Intrusion detection systems also often overwhelm a system's administrator with too much detail about network behavior, and moreover are configured to trigger a report only after discovery of a network attack. Of course, at that point in time it may be too late to prevent the attack or to remedy much of the possible damage.

After-the-fact auditing systems provide another type of tool used under the risk management approach. Auditing systems are implemented as a host-based technique, in which a central server, running the operating system, logs the activity of client computers in a central storage area. However, the host computer running the audit system itself may be susceptible to being attacked internally or externally, creating a point of vulnerability in the overall surveillance.

Some other auditing products employ so-called sniffer technology to monitor network traffic. Data streams collected by such products look for specific types of network traffic by, for example, detecting electronic mail uploads by monitoring port 25 for simple mail transfer protocol (SMTP) events. However, most networks carry a large amount of traffic and simple sniffer type tools do not help sift through the volume. Other drawbacks exist.

In light of the foregoing, more robust and comprehensive network security technology is desirable.

SUMMARY OF THE INVENTION

Embodiments of the present invention provide, among other things a method that includes collecting packets that have been transmitted over a network (e.g., the Internet, a private LAN, a WAN, etc.) during a communication session (e.g., a TCP/IP session) and assembling those packets into at least one communication session that transpired between the two communicating entities. The method further includes providing the packets of the at least one communication session to a parser and parsing the packets of the at least one communication session using a first portion of the parser that was compiled at a first time, and also parsing the packets of the at least one session using a second portion of the parser that was compiled at a second time different from the first time. Results of the parsing may then be displayed on a display.

Embodiments of the present invention thus enable a user to use not only a pre-compiled portion of a parser, but also a user-customized portion that may be compiled well after the parser is received from a vendor. That is, the parsing module of the system allows for customizable parsing definitions. These definitions may be provided using, for example, an XML file that is then compiled.

In one aspect of the invention, the method includes parsing both a client side and a server side of the communication session. The communication session may have transpired in accordance with a TCP/IP session.

The parsing itself may include pattern matching, comparing variables, among other possible techniques.

These and other features of embodiments of the present invention, and their attendant advantages, will be more fully appreciated upon a reading of the following detailed description in conjunction with the accompanying drawings.

DESCRIPTION OF EMBODIMENTS OF THE INVENTION

In accordance with embodiments of the present invention, unstructured data (in the form of packets) are preprocessed into streams (one side of a conversation between network components). Streams are then again grouped into sessions which contain both sides of a "conversation". Sessions are then analyzed through a lexer, as described in, e.g., Parsers then extract critical data from these sessions, (referred to as "meta-data") and store that data into databases for future retrieval. The foregoing process is described in detail in U.S. Patent Publication No. U.S. 2002/0163934 A1, entitled Apparatus and Method for Network Analysis, filed Apr. 29, 2002, which is incorporated herein by reference.

Figure 1:
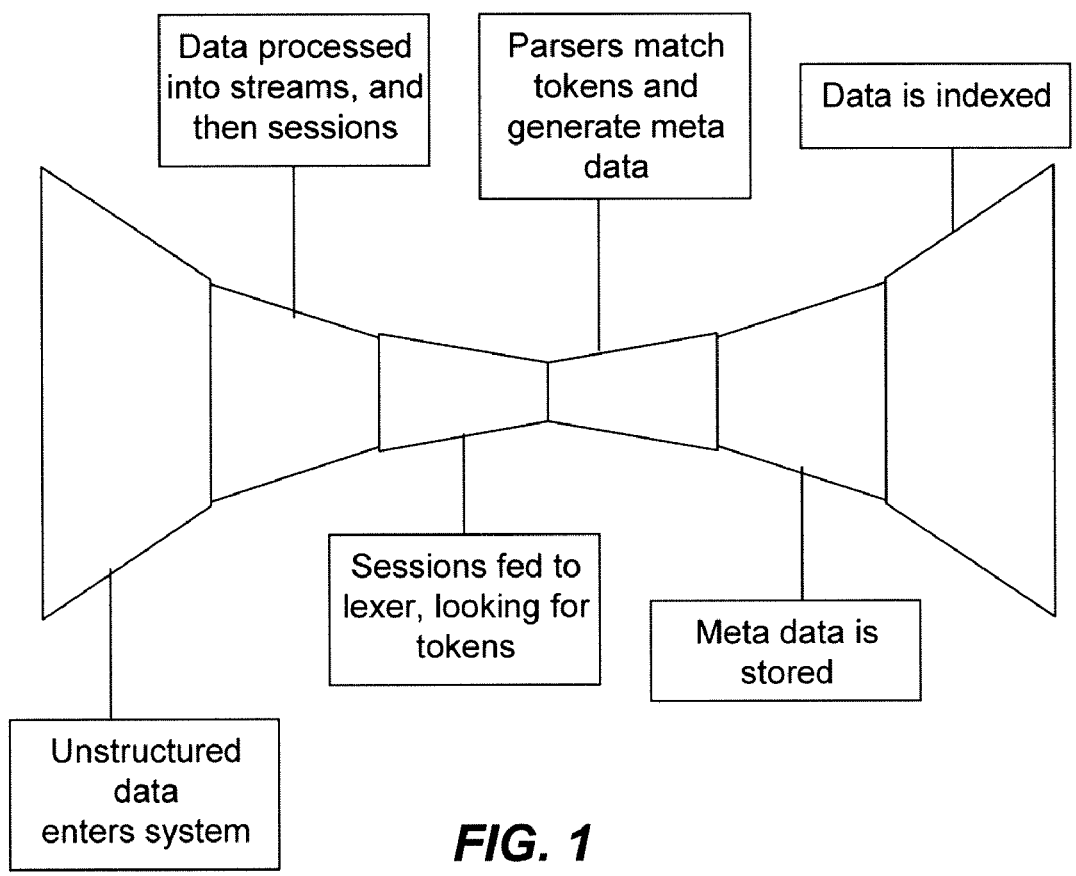
FIG. 1 is a schematic diagram that represents an amount of processing and system constraints placed upon respective tasks.

Now consider that process, in terms of a high speed network, and further in terms of a processing engine. The system is designed to use large buffers to store incoming data at each point of processing. Buffers are desirable due to the nature of continual data flow. There is a constant push of incoming data, at each and every processing point along the data path. Moreover, after processing occurs at the lexing and parser levels, data is processed and stored in several databases. With reference to FIG. 1, the height of the diagram schematically represents the amount of processing and system constraints placed upon each specific task. Raw unstructured data enters on the left, in the form of packets. Packets are then buffered and linked to other packets forming streams of communications between network components. Streams are then buffered and linked to one another to form sessions, or complete conversations between network components. Sessions are then fed through the lexer, where the presence of tokens triggers processing by parsers in the next step. Metadata is then extracted by the parsers and fed to the database engines, where the data is finally deposited into real time databases. Pressure is present on the data flow on both ends due not only to significant requirements of data processing, but interaction with slower parts of the system—namely disk and input/output (I/O) components. Central processing occurs mostly in memory and on buffered structured data.

When dealing with queues, a breakdown anywhere along the data flow path would represent systemic processing delays along the entire path. The necessity for optimized processing in the center of the flow, namely the lexing and parsing portions is evident.

Optimized processing has traditionally required pre-compiled parsing code. However, pre-compiled code is often at odds with the nature of modern networks where:

Protocols change and grow in complexity over time

The explosion of custom networking applications introduces new and complex protocols on a continual basis More and more programs are written as extensions to standard protocols such as web based custom applications The ever changing security landscape of modern networks demands continual changes in the desired output of network monitoring systems Customers run proprietary applications that cannot be analyzed by the creators of the monitoring software Thus, pre-compiled parsing logic has the disadvantages of relying on a particular vendor that created the software to modify any parsing definitions, test and distribute to clients. This can typically result in software instabilities, performance issues, and ultimately parsing logic that is outdated by the time it reaches customers.

In other words, pre-compiled interpretation or parsing logic is not flexible enough to keep up with ever changing network protocols, and typical methods of expanding parser logic require timely product updates. A faster method of parser logic expansion is needed while maintaining stability and performance of the entire system.

Figure 2:
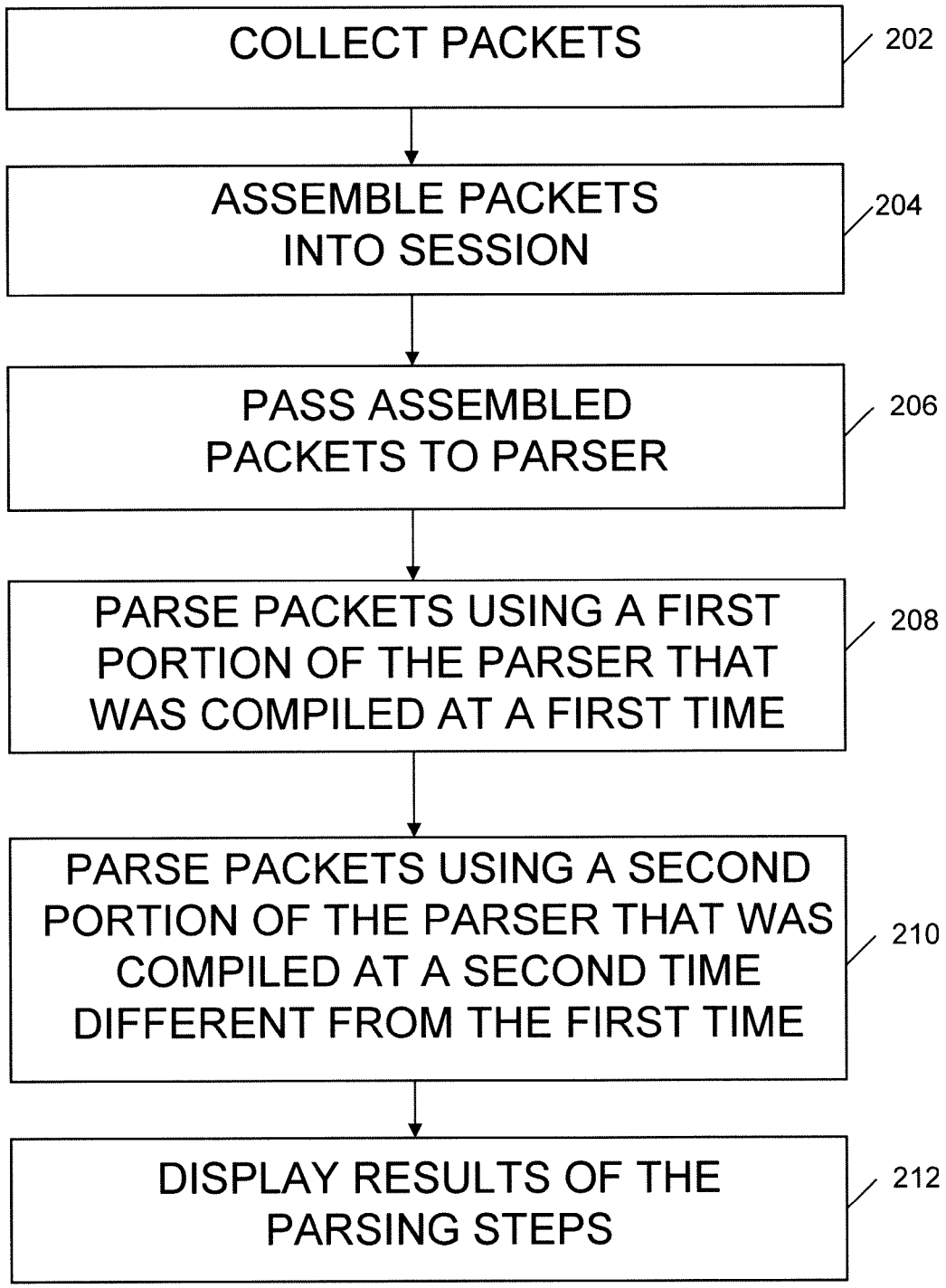
FIGS. 2 and 3 depict flow charts of methods in accordance with an embodiment of the present invention.
Figure 3:
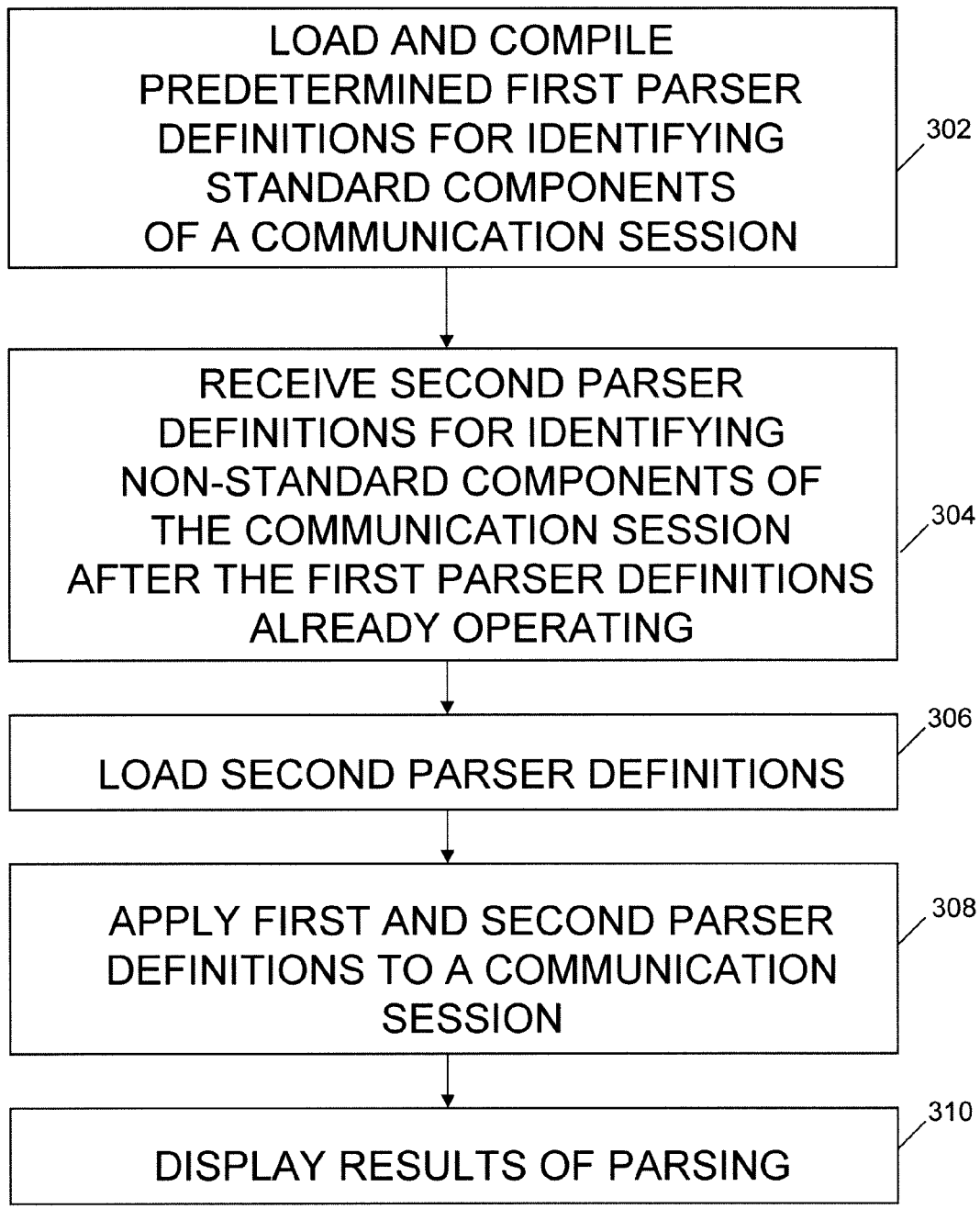

FIGS. 2 and 3 depict embodiments of processes in accordance the present invention. More specifically, and as shown in FIG. 2, a method in accordance with the present invention includes, at step 202, collecting packets that have been transmitted over a network during a communication session. Then, at step 204, those packets are assembled into at least one communication session that transpired between two entities. Collection and assembly techniques for purposes of embodiments of the present invention are disclosed in, e.g., U.S. Patent Publication No. U.S. 2002/0163934 A1, entitled Apparatus and Method for Network Analysis. This patent publication also discloses a methodology by which assembled sessions are parsed to capture one or more events or attributes in connection with the session, the subject of the next step.

Further in accordance with the present invention, at step 206, the packets associated with individual sessions are passed through a series of parsers. However, rather than simply being a hard-coded parser, the parser in accordance with the present invention is comprised of two portions: a first portion and a second portion, e.g., static parsers and customizable parsers.

That is, at step 208, the parser parses the packets of the at least one communication session using the first portion of the parser that was compiled at a first time, and then, at step 210, also parses the packets of the at least one session using a second portion of the parser that was compiled at a second time different from the first time. Results of the parsing steps are preferably displayed to a user at step 212.

Historically dealing with high speed networks required a vendor to compile processing logic into software to reach acceptable speeds. The present invention (also referred to herein as "FlexParse™"), on the other hand, exposes logic to an end user to change device operation on several levels. FlexParse™ further enables complex operations (coding language) and data extraction straight from network streams.

FlexParse™ provides a dynamic interface to dictate how the parser identifies sessions and what data it extracts. More specifically, while the first portion of the parser may be hard coded as part of an overall network analysis system that is purchased by the end-user, the second portion of the parser is customizable in that an end-user can define his own parser definitions. This enables analysts who are working in selected, perhaps more obscure, fields to tailor parser functionality. In one implementation, the parser definition is provided using an XML file, which is subsequently compiled and run as part of the overall parsing routine.

In a preferred embodiment, FLEXPARSE™ provides parsing of both the client request and server response streams of a network communication. These two streams are herein referred to as a session. The session itself may be, e.g., a pair of TCP/IP streams between two hosts. The second portion of the parser may include pattern matching, variable comparing, among other functionality.

More specifically, second parser (i.e., its definitions) preferably enables token and metadata declaration, token and pattern matching, logic functions and variable operations, and/or metadata registration and extraction.

Further, the second parser can preferably provide a host of functionality including, but not limited to:

General functions—assign, if, end, while

Arithmetic functions—and, or, +/−, divide, multiply . . . .

Figure 4:
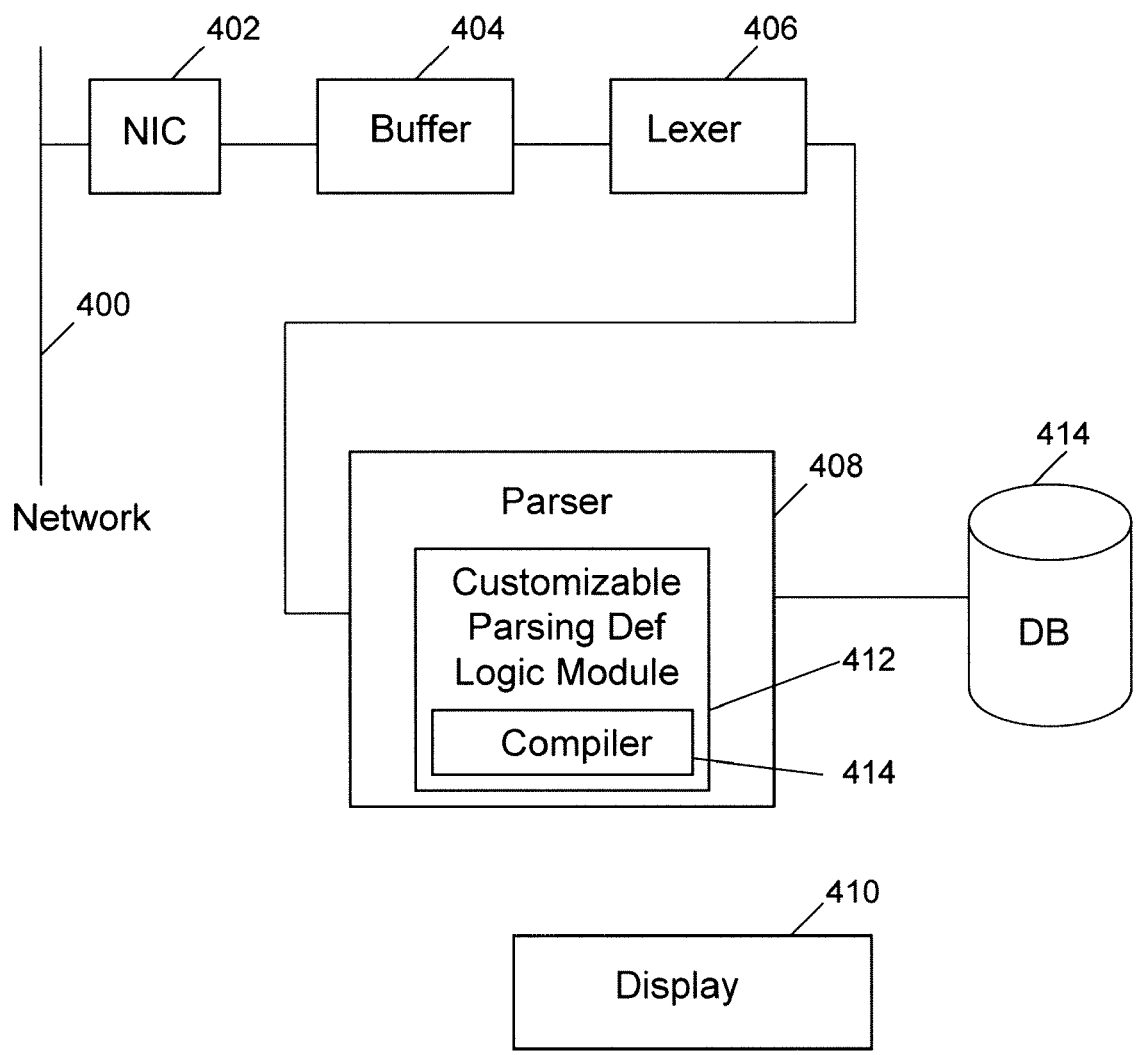
FIG. 4 is a system diagram showing where logic for performing aspects of the present invention may be located.

String functions (on tokens)—append, find, length, regex (Perl), substring, upper/lower Payload functions (on session)—find, move, read, regex Furthermore, in a preferred embodiment, the second parser can be configured to obtain or access data from a remote data file or list. For example, a definition for a second parser might include a path to a data file that includes a list of words that are sued to match tokens provided by a lexer 406 (FIG. 4).

As indicated, the second portion of the parser is customizable. Accordingly, while the first portion (which is typically provided to the end-user) might be configured to identify "standard" components of a communication session (e.g., SMTP mail, WWW traffic, FTP, TELNET or other publicly defined protocols), the second parser might be configured to identify non-standard (or non-publicly defined) components of the communication session.

As an example, a non-publicly defined protocol may be a proprietary protocol employed by financial institutions for financial trading. Bloomberg is an example of a financial services product that may have such a protocol. Additionally, the second parser may be used to define complex emerging threat or command and control techniques including, for example, the identification and meta extraction of FastFlux activity or malicious beacon network communications. (Fastflux is a method used to quickly change IP addresses associated with a host name in the Domain Naming System (DNS) infrastructure. For example, a terrorist organization might use fastflux to keep mobile their website from being identified and shut down.) Other examples include SCADA, Mainframe, PeopleSoft, Gnutella, XBox Live, Second Life, World of Warcraft, or CRM (Customer Relationship Management) system protocols.

Preferably, the XML file (or other means) of defining the second parser is first validated by the overall system to ensure that the "proposed" second parser is in fact compatible and operable with the overall system.

FIG. 3 depicts how the first and second parsers can be used in accordance with the present invention. At step 302, predetermined first parser definitions are loaded and compiled (or arrive already compiled, e.g., in binary form, with a system from a vendor). The predetermined first parser includes definitions for identifying "standard" components of a communication session. Then at step 304, the session analysis system receives second parser definitions (in, e.g., a non-binary format such as XML) for identifying non-standard components of the communication session after the first parser definitions are already operating.

At step 306 those second parser definitions are loaded into the system and separately compiled. Then, at step 308, the first and second parser definitions are applied to a communication session and at step 310, results of the parser are displayed on a display for a user to analyze. Those skilled in the art will appreciate that the second parser definitions can complement the first parser definitions (or first portion of the parser) or include definitions that are entirely different from the first parser definitions. Also, in accordance with a preferred embodiment of the present invention, the second parser definitions can be loaded and compiled and employed without having to restart or re-compile the first parser definitions. As a result, the second parser definitions can be changed or modified "on the fly" thereby providing increased flexibility to a user of the system.

FIG. 4 is a system diagram showing where logic for performing aspects of the present invention may be located. A network interface card 402 is connected to a network 400. Packets travelling across the network may be "sniffed" or captured by NIC 400 and passed to buffer 404. From there, the packets are arranged into sessions and passed to lexer 406. Output of the lexer 406, e.g., tokens, is passed to parser 408 which is configured to operate as described herein, including passing the parsed data to database 414. A display 410 and/or other input/output equipment may be used to control the system including entering customized parsing definitions. As shown, Customizable Parsing Definition Logic Module 412 is part of parser 408 (but could also be separately implemented). The logic may be in the form of software code instructions stored in memory (not shown) and may include a dedicated compiler 414 for, e.g., XML parser definition input. The logic may also be configured to validate any input provided as a parser definition. The logic may likewise be implemented digital logic gates, a programmable gate array device or other programmable or fixed logic device. In other words, the logic may be part of a general purpose computer programmed to operate in the manner described, or the logic may be implemented as a specific separate machine for carrying out the functionality described herein.

In sum, and significantly, the FLEXPARSE™ approach is preferably applied to network sessions, and preferably has the following attributes:

1. Regarding user context: the end user of the capability is an average user, not a developer.

2. XML schema for registration of creation of meta data (parser definition).

3. Compiler to convert XML based code to native predefined functions.

4. Registration of token matches and other parser meta extraction as listeners to take custom actions such as application identification and custom meta extraction. This allows for new parsers to build on previous work thus reducing processing time while expanding parsing logic. This is not merely a signature trigger but actually a method to generically identify specific network data and extract virtually any type of information from a session.

5. Registration of meta callbacks from other parsers to enable additional, typically more specific, meta extraction. This allows for new parsers to build on top of previous work thus reducing process time.

6. Logic can span streams; hence the parser can maintain state to evaluate client and server side of session prior to making a decision.

7. Logic supports binary streams (current manifestation is text; similar implementations in non-network worked may be text-only).

8. Logic supports pattern matching.

9. Logic supports advanced operators (effectively creating a programming language for parsing network traffic).

The following are example XML files that can be used as parser definitions for input into the system and compiled for use as a second portion of an overall parser.

Match Port and Identify Immediately

```
<?xml version="1.0" encoding="utf-8"?>
<parsers
    xmlns:xsi="http://www.w3.org/2001/XMLSchema-instance"
    xsi:noNamespaceSchemaLocation="parsers.xsd">
    <parser name="CustApp" desc="Acme Custom App"
    service="45324">
        <declaration>
            <port name="port" value="45324" />
        </declaration>
        <match name="port">
            <identify />
        </match>
    </parser>
</parsers>
```

Match Port and Delay Identification

```
<?xml version="1.0" encoding="utf-8"?>
<parsers
    xmlns:xsi=http://www.w3.org/2001/XMLSchema-instance
    xsi:noNamespaceSchemaLocation="parsers.xsd">
    <parser name="MSRPC" desc="Microsoft RPC protocol"
    service="135">
        <declaration>
            <port name="port" value="135" />
            <number name="state" scope="session" />
            <session name="end" value="end" />
        </declaration>
        <match name="port">
            <assign name="state" value="1" />
        </match>
        <match name="end">
            <if name="state" equal="1">
                <identify />
            </if>
        </match>
    </parser>
</parsers>
```

Match Token and Identify Immediately

```
<?xml version="1.0" encoding="utf-8"?>
<parsers
    xmlns:xsi="http://www.w3.org/2001/XMLSchema-instance"
    xsi:noNamespaceSchemaLocation="parsers.xsd">
    <parser name="RDP" desc="Remote Desktop Protocol"
        service="3389">
        <declaration>
            <token name="signature" value="Cookie:
                mstshash=" />
        </declaration>
        <match name="signature">
            <identify />
        </match>
    </parser>
</parsers>
```

Match Multiple Tokens

```
<?xml version="1.0" encoding="utf-8"?>
<parsers
    xmlns:xsi="http://www.w3.org/2001/XMLSchema-instance"
    xsi:noNamespaceSchemaLocation="parsers.xsd">
    <parser name="MyServiceMultiToken" desc="Multiple Tokens" service="333">
        <declaration>
            <number name="state" scope="stream" />
            <token name="user" value="USER " />
            <token name="pass" value="PASS " />
            <session name="session" value="end" />
        </declaration>
        <match name="user">
            <or name="state" value="1" />
        </match>
        <match name="pass">
            <or name="state" value="2" />
        </match>
        <match name="session">
            <if name="state" equal="3">
                <identify />
            </if>
        </match>
    </parser>
```

Although the apparatus, logic, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, logic, and method, as set forth in the following claims.

What is claimed is:

1. A method comprising:
   collecting packets that have been transmitted over a network during a communication session;
   assembling the packets into at least one communication session that transpired between two entities;
   passing the packets of the at least one communication session to a parser;
   parsing the packets of the at least one communication session using a first portion of the parser that was compiled at a first time, and also parsing the packets of the at least one session using a second portion of the parser that was compiled at a second time different from the first time; and
   displaying results of the parsing steps on a display,
   wherein the second portion of the parser is defined by an end user of the parser and includes a path to a data file that includes tokens used for said parsing using the second portion of the parser.

2. The method of claim 1, further comprising receiving a parser definition for the second portion of the parser in a non-binary form.

3. The method of claim 2, wherein the definition is provided using an XML file.

4. The method of claim 3, further comprising compiling the XML file.

5. The method of claim 1, further comprising parsing both a client side and a server side of the at least one communication session.

6. The method of claim 1, wherein the communication session is a TCP/IP session.

7. The method of claim 1, wherein parsing comprises at least one of pattern matching and comparing variables.

8. The method of claim 7, further comprising at least one of token and metadata declaration, token and pattern matching, logic functions and variable operations, and/or metadata registration and extraction.

9. A method of performing analysis of a communication session between two entities, comprising;
   loading predetermined first parser definitions, stored as at least one binary file;
   receiving second parser definitions in a form other than a binary file form, after the first parser definitions are already operating;
   loading the second parser definitions;
   compiling the second parser definitions; and
   applying the first and second parser definitions to a communication session,
   wherein receiving second parser definitions comprises receiving a path to a data file that includes tokens used for said second parser definitions.

10. The method of claim 9, wherein the first parser definitions identify a publicly defined protocol.

11. The method of claim 9, wherein the second parser definitions identify a non-publicly defined protocol.

12. The method of claim 11, wherein the non-publicly defined protocol is a protocol employed by financial institutions.

13. The method of claim 9, wherein the communication session is a TCP/IP session 14. The method of claim 9, wherein the second parser definitions include a token definition.

15. The method of claim 14, wherein the token identifies a predetermined service.

16. The method of claim 15, wherein the predetermined service is an Internet service.

17. The method of claim 9, further comprising validating the second parser definitions.

18. The method of claim 9, further comprising receiving the second parser definitions in the form of one or more XML files.

19. Logic encoded in one or more tangible media for execution and when executed operable to:
   load predetermined first parser definitions, stored as at least one binary file;
   receive second parser definitions in a form other than a binary file form, after the first parser definitions are already operating;
   load the second parser definitions;
   compile the second parser definitions; and
   apply the first and second parser definitions to a communication session,
   wherein the second parser definitions are received by receiving a path to a data file that includes tokens used for said second parser definitions.

* * * * *